(12) United States Patent
Jeong

(10) Patent No.: US 7,555,067 B2
(45) Date of Patent: Jun. 30, 2009

(54) METHOD AND APPARATUS FOR DECODER INPUT SCALING BASED ON INTERFERENCE ESTIMATION IN CDMA

(75) Inventor: Gibong Jeong, San Diego, CA (US)

(73) Assignee: Texas Instruments Incorporated, Dallas, TX (US)

( * ) Notice: Subject to any disclaimer, the term of this patent is extended or adjusted under 35 U.S.C. 154(b) by 966 days.

(21) Appl. No.: 10/387,876

(22) Filed: Mar. 13, 2003

(65) Prior Publication Data
US 2004/0179583 A1    Sep. 16, 2004

(51) Int. Cl.
H04L 27/06    (2006.01)
H03D 1/04    (2006.01)
(52) U.S. Cl. .................................. 375/340; 375/346
(58) Field of Classification Search .............. 375/316, 375/377, 345–347, 340, 259, 262, 265, 287, 375/130, 140, 144, 145, 147, 148, 149; 714/794, 714/795; 708/806, 800; 455/232.1, 296, 455/67.3, 136–138, 133, 63.1, 67.13; 370/500, 370/441, 342, 491, 335
See application file for complete search history.

(56) References Cited

U.S. PATENT DOCUMENTS

| | | | | |
|---|---|---|---|---|
| 5,249,200 A | * | 9/1993 | Chen et al. | 375/285 |
| 5,619,524 A | * | 4/1997 | Ling et al. | 375/130 |
| 5,623,485 A | * | 4/1997 | Bi | 370/209 |
| 5,917,865 A | * | 6/1999 | Kopmeiners et al. | 375/345 |
| 6,005,506 A | * | 12/1999 | Bazarjani et al. | 341/143 |
| 6,009,129 A | * | 12/1999 | Kenney et al. | 375/346 |
| 6,154,443 A | * | 11/2000 | Huang et al. | 370/210 |
| 6,424,642 B1 | * | 7/2002 | Schmidl et al. | 370/342 |
| 6,480,528 B1 | * | 11/2002 | Patel et al. | 375/148 |
| 6,804,311 B1 | * | 10/2004 | Dabak et al. | 375/347 |
| 6,865,218 B1 | * | 3/2005 | Sourour | 375/148 |
| 7,103,116 B2 | * | 9/2006 | Thompson et al. | 375/340 |
| 7,180,881 B2 | * | 2/2007 | DiFazio | 370/335 |
| 7,340,013 B2 | * | 3/2008 | Ammer et al. | 375/340 |
| 2002/0146041 A1 | * | 10/2002 | Demir et al. | 370/503 |
| 2003/0224836 A1 | * | 12/2003 | Tsai et al. | 455/573 |
| 2004/0125862 A1 | * | 7/2004 | Li et al. | 375/147 |

\* cited by examiner

*Primary Examiner*—Mohammad H Ghayour
*Assistant Examiner*—Vineeta S Panwalkar
(74) *Attorney, Agent, or Firm*—Ronald O. Neerings; Wade James Brady, III; Frederick J. Telecky, Jr.

(57) ABSTRACT

A method and apparatus adaptively scales the decoder input for a low-cost user equipment (UE) to reduce the memory requirement without degrading decoder performance. In order to optimize the decoder performance for a small number of input bits, the method estimates the interference of the inner receiver output and scales the decoder input such that its variance is kept constant. The method further estimates the interference of the Pilot channel and translates it into the interference of the data channel in order to avoid the estimation bias problem in a noisy channel. The method then uses a difference value of the phase-corrected pilot symbol to solve the fading rate dependency problem of the sample mean method. For a Rake receiver, the method sums up the interference estimated from each finger. For a multi-antenna receiver, the method sums up the interference estimated from each antenna demodulating element.

20 Claims, 3 Drawing Sheets

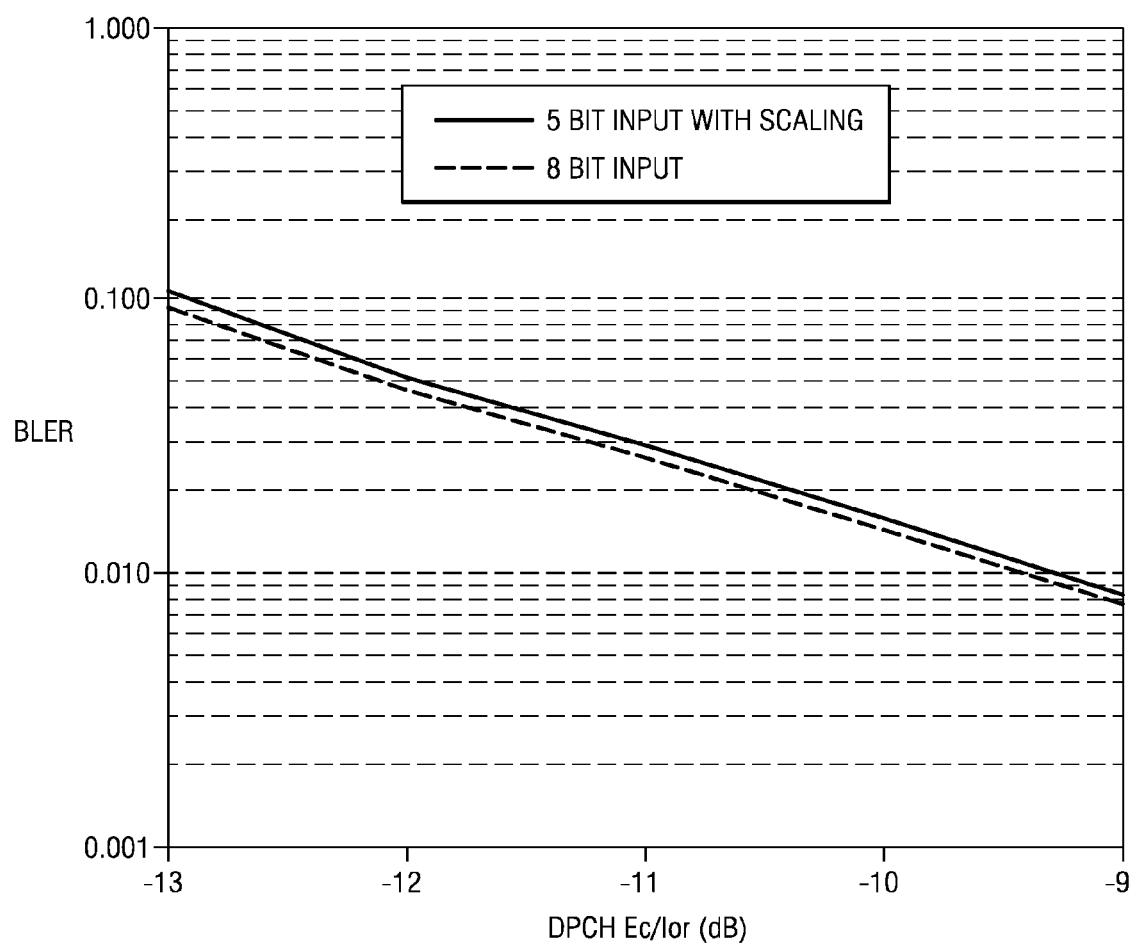

METHOD AND APPARATUS FOR DECODER INPUT SCALING BASED ON INTERFERENCE ESTIMATION IN CDMA

BACKGROUND OF THE INVENTION

1. Field of the Invention

This invention relates generally to code division multiple access (CDMA) systems and methods, and more particularly to a method and apparatus for decoder input scaling based on interference estimation in CDMA applications.

2. Description of the Prior Art

In code division multiple access (CDMA) cellular networks like W-CDMA for a universal mobile telecom system (UMTS) and CDMA2000 systems, the receive part of the user equipment (UE) consists of an inner receiver and an outer receiver. The inner receiver demodulates a received signal into symbols whereas an outer receiver forms a frame from symbols, performs frame processings such as frame interleaving, rate matching, and finally decodes error-correcting-coded frames. Among many possible techniques, a Rake receiver, a minimum mean squared error (MMSE) receiver, a decorrelating receiver, an equalizer and an interference canceller are widely used in CDMA systems. Because a wireless channel fades over time and the number of multipath components changes over time, the output of the inner receiver requires a large dynamic range. On the other hand, for the purpose of saving the frame memory, the output signal of the inner receiver is quantized to a smaller number of bits and (via some frame processing blocks like deinterleavers and rate matching blocks) goes to soft-decision decoders. It is well known that both Viterbi and turbo decoders require only 3 to 5 bits of input precision in an additive white Gaussian noise (AWGN) channel. But, in a mobile channel, because of the large dynamic range of the inner receiver, as many as 8 bits of precision have been used in some designs. This increases the memory requirement of the channel bit memory that dominates the entire UE modem memory requirement because of a large code block size.

In view of the foregoing, it would be both advantageous and desirable in the wireless communication art to provide a method and apparatus for adaptively scaling the decoder input for a low-cost UE digital baseband (DBB) chip. This method should reduce the memory requirement without degrading decoder performance.

SUMMARY OF THE INVENTION

The present invention is directed to an apparatus and method for estimating the interference of an inner receiver output and scaling the decoder input such that its variance is kept constant in order to optimize the decoder performance for a small number of input bits. The method estimates the interference of the Pilot channel and translates it into the interference of the data channel in order to avoid the estimation bias problem in a noisy channel. To solve the fading rate dependency problem of the sample mean method, the method uses a difference value of the phase-corrected pilot symbol. For an inner receiver of the Rake receiver type, the method sums up the interference estimated from each finger or demodulating element. It is then a simple task to find an optimal set point value for the method in static channel. The method using a 5-bit decoder input and the optimal set point value yields performance as good as an 8-bit decoder input. This scheme is critical in saving the memory of the frame buffer and the gate count of the decoder.

In one aspect of the invention, a method provides for scaling the decoder input according to data channel interference such that the noise variance of the scaled input signal is constant.

In another aspect of the invention, a method provides for estimating the data channel interference from pilot channel interference.

In yet another aspect of the invention, a method provides for measuring the pilot channel interference using pilot symbol difference for mitigating the fading channel impairment.

In still another aspect of the invention, a method provides for scaling an inner receiver output for quarternary phase shift keying (QPSK) modulation.

Still another aspect of the invention is associated with a method that provides for scaling the output of a transmit antenna diversity combiner for QPSK modulation.

Still another aspect of the invention is associated with a method that provides for scaling the output of a receive antenna diversity combiner for QPSK modulation.

Still another aspect of the invention is associated with a method that provides for calculating the log likelihood ratio of a quadrature amplitude modulation (QAM) demapper using data channel interference.

BRIEF DESCRIPTION OF THE DRAWINGS

Other aspects and features of the present invention and many of the attendant advantages of the present invention will be readily appreciated as the aspects and features become better understood by reference to the following detailed description when considered in connection with the accompanying drawings in which like reference numerals designate like parts throughout the figures thereof and wherein:

FIG. 5 is a graph showing turbo decoder performance of the 5-bit decoder input using the scaling method described herein in accordance with detailed embodiments of the present invention, as compared with an 8-bit decoder input.

Figure 1:
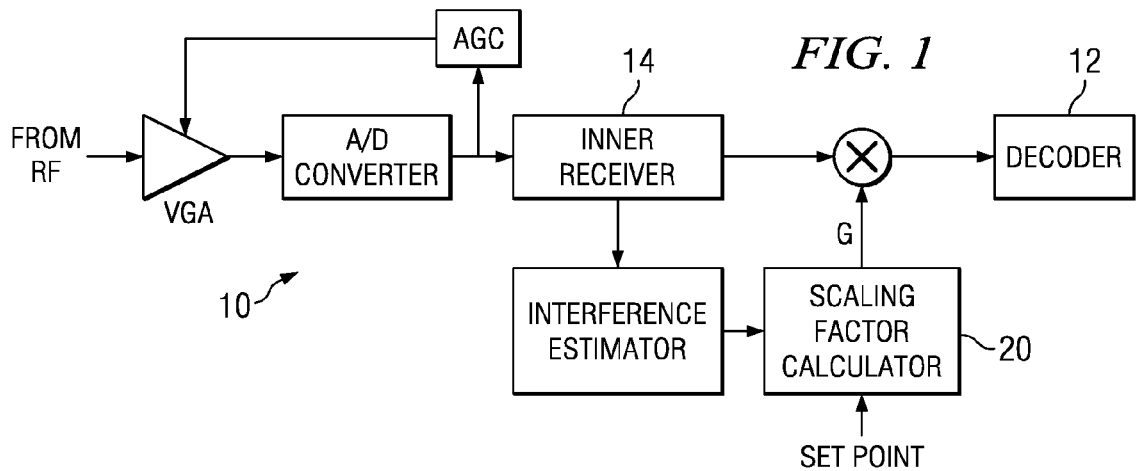
FIG. 1 is a block diagram illustrating a user equipment receiver chain.

While the above-identified drawing figures set forth alternative embodiments, other embodiments of the present invention are also contemplated, as noted in the discussion. In all cases, this disclosure presents illustrated embodiments of the present invention by way of representation and not limitation. Numerous other modifications and embodiments can be devised by those skilled in the art which fall within the scope and spirit of the principles of this invention.

DETAILED DESCRIPTION OF THE PREFERRED EMBODIMENTS

It is well known that most known techniques for scaling decoder inputs have tried to use a traditional gain control method. The mean square and/or the mean absolute values of the inner receiver output, for example, were used in some applications. One known application used a conservative scaling method where the largest quantization level is set to the maximum absolute value of the inner receiver output. This conservative scaling method specified 8-bits for the width of the decoder input memory. Similarly, most other solutions specified 8-bits for the decoder input memory in fading channels, which is much larger than AWGN requirements.

The detailed embodiments described herein below with reference to the figures, use the noise variance of the data channel instead of the mean square and/or the mean absolute values of the signal in order to scale the decoder input. The inner receiver output can be modelled by $$y = \sqrt{E_s}d + n.$$

Here, d is a true symbol, y is an inner receiver output, $E_s$ is the symbol energy, and n is the noise plus interference with zero mean and variance equal to $E[n^2] = \rho^2$. We will use the term, noise and interference interchageably from here on. Then the input to a soft-input decoder that is herein after referred to as the log-likelihood ratio (LLR) is given for an AWGN channel by $$L_c(y) = \log\left(\frac{P(y|d=+1)}{P(y|d=-1)}\right) = \log\frac{\exp\left(-\frac{(y-\sqrt{E_s})^2}{2\sigma^2}\right)}{\exp\left(-\frac{(y+\sqrt{E_s})^2}{2\sigma^2}\right)} = \frac{2\sqrt{E_s}\,y}{\sigma^2}.$$

Some known techniques normalized the received symbol by the signal amplitude, $\sqrt{E_s}$ before storing the quantized symbols into the decoder input memory as follows:

$$L_c(y) = \frac{2\sqrt{E_s}\,y}{\sigma^2} \approx 2K_1 Q\left(\frac{y}{\sqrt{E_s}}\right).$$

Here, Q(x) is the quantization function and $$K_1 = \frac{E_s}{\sigma^2}$$

is a symbol signal-to-noise ratio (SNR). Other known techniques quantized the LLR directly before storing it in the memory.

$$L_c(y) = \frac{2\sqrt{E_s}\,y}{\sigma^2} \approx 2Q\left(\frac{E_s}{\sigma^2}\frac{y}{\sqrt{E_s}}\right)$$

But these scaling methods were often also problematic because the signal or symbol energy is difficult to estimate correctly. As a result, they require more bits. The present inventor recognized that in a fading propagation environment, the above methods, and especially the first one, exhibits a wide dynamic range that requires a large number of bits because the signal energy fluctuates as the channel gain fades over time.

This problem has been addressed in the prior art by using the mean absolute value of symbol, E[|y|] instead of $\sqrt{E_s}$ for scaling. But, this approach is also problematic in that it induces a bias problem because y includes noise; and the absolute value will add a noise bias. This is known to cause some decoder performance loss.

A method is now described herein below that normalizes the received symbol by the root mean square (RMS) value of the noise as follows:

$$L_c(y) = \frac{2\sqrt{E_s}\,y}{\sigma^2} = 2K_2 Q\left(\frac{y}{\sigma}\right), \text{ where}$$

$$K_2 = \sqrt{\frac{E_s}{\sigma^2}}.$$

The present inventor recognized the noise variance, unlike the signal or symbol energy, does not fluctuate significantly as the channel fades. Consequently, the proposed normalization method will require fewer bits for the same decoder performance than required using known techniques. At high symbol signal-to-noise ratio (SNR), the signal component will be saturated. But it is well known that both Viterbi decoders and turbo decoders are less sensitive to the clipping quantization error than the round-off quantization error. On the other hand, in the signal-based scaling used in the prior arts, at high symbol SNR, the round-off quantization error will easily dwarf the channel noise and cause the decoder error floor to rise. A simulation described herein below confirms the foregoing conclusions.

Looking now at FIG. 1, a system block diagram illustrates a UE receiver chain 10. The decoder 12 typically implements the weighting part (multiplication by $K_2$) as part of the total LLR calculation or min* (min star) calculation that often lessens the accuracy requirement of SNR estimation.

On the other hand, just as it is difficult to estimate the signal power of the data channel, so is it difficult to measure the noise or interference power of the data channel because the data bits are not known to the receiver 14 in advance. So, the present inventor instead employs a Pilot channel to measure the interference power and converts it to the data channel interference. By using the pilot-aided estimation, the inventive method was found by the present inventor to not only improve measurement accuracy in a noisy channel by using a known pilot pattern, but also was found capable of measuring the noise continuously, even when the data channel is not transmitted temporarily, which is often the case in a bursty packet data service.

After despreading, the received Pilot channel symbol can be denoted as follows:

$$p(t) = h(t)s_p(t) + n_p(t)$$

Here, $h(t) = \alpha(t)e^{j\phi(t)}$ is the complex channel response, $\alpha(t)$ is the channel amplitude, $\phi(t)$ is the channel phase, $s_p(t)$ is the transmitted pilot symbol, $n_p(t)$ is the despread interference plus noise with variance of $\sigma_p^2$, and p(t) is the received pilot symbol at time t. The present inventor importantly recognized that $n_p(t)$ includes not only interference from other base stations but also all the noise components that degrade the decoder performance such as thermal noise, receiver noise generated by RF/analog circuits and analog-to-digital converters, digital baseband noise due to timing jitter and channel estimation error, and the like. After channel correction and, if any, pilot symbol sequence uncovering, the phase-corrected pilot symbol is equal to $$p'(t) = h^*(t)p(t) = \alpha^2(t) + \alpha(t)e^{-j\phi(t)}n_p(t) \qquad (1)$$

The p'(t) represents the pilot channel output of an inner receiver that can be, for example, a Rake receiver, an MMSE receiver, an equalizer, a decorrelating receiver or an interference canceller.

One straightforward way to measure the interference of the Pilot channel at the output of an inner receiver is to use the sample mean and derive the variance $\sigma_p^2$ as follows:

$$\hat{\sigma}_p^2 = \frac{1}{\alpha^2}\left\{\frac{1}{N_s}\sum_{t=1}^{N_s}|p'(t)|^2 - \left|\frac{1}{N_s}\sum_{t=1}^{N_s}p'(t)\right|^2\right\} \quad (2)$$

The summation over time is typically performed over a time slot in W-CDMA or a power control group in CDMA2000 (called the estimation interval). So, $N_s$ is the number of complex pilot symbols in the estimation interval. The normalization constant $\alpha^2$ is simply the channel power averaged over the estimation interval.

$$\alpha^2 = \frac{1}{N_s}\sum_{t=1}^{N_s}\alpha^2(t)$$

This sample mean method was recognized by the present inventor to present two problems. First, the sample mean method always underestimates the variance in a static channel because the sample mean in fact minimizes the variance estimator, i.e., $$\hat{m} = \underset{m}{\operatorname{argmin}}\left\{\sum_t|p'(t)|^2 - m^2\right\} = \sum_t p'(t) \quad (3)$$

Second, the sample mean method does not work properly in a time-varying channel. Even though the channel phase distortion is corrected, the amplitude variation causes the expected value of the estimation and thus the interference estimation to be far off the true value by the amount of the second term of the following equation.

$$E[\hat{\sigma}_p^2] = \sigma_p^2 + \frac{1}{\alpha^2}\left\{\frac{1}{N_s}\sum_{t=1}^{N_s}\alpha^4(t) - \left|\frac{1}{N_s}\sum_{t=1}^{N_s}\alpha^2(t)\right|^2\right\}$$

Figure 2:
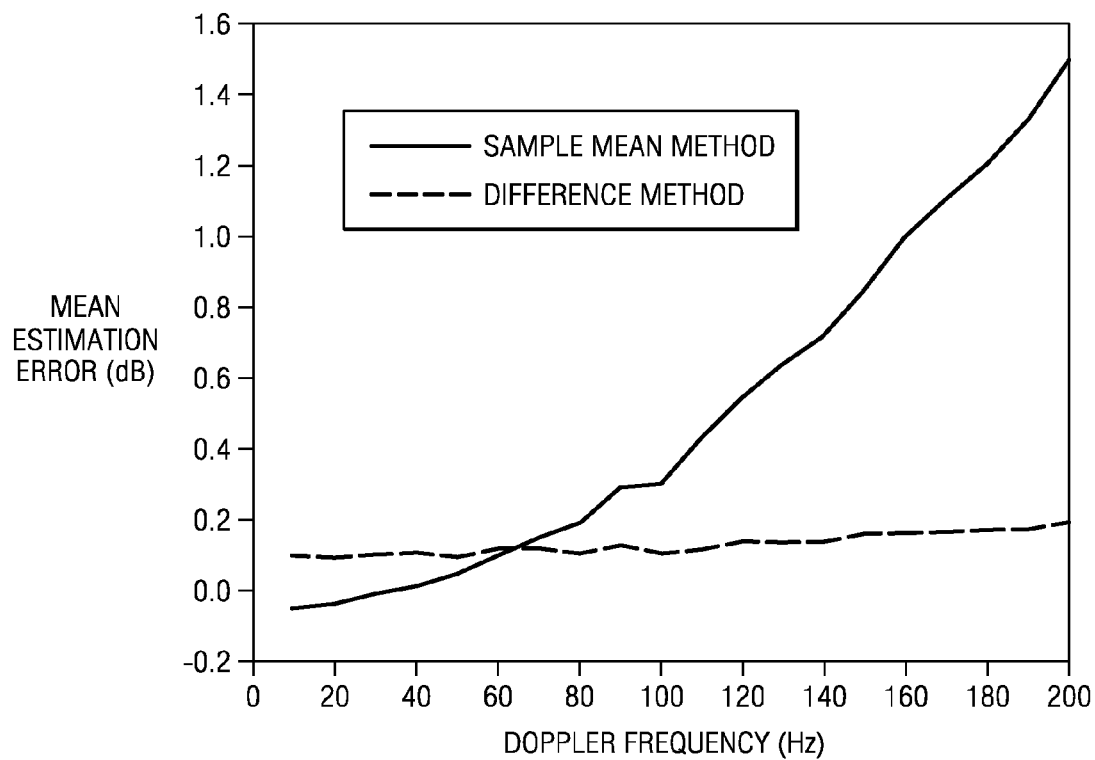
FIG. 2 is a graph depicting plots for the interference estimation error in a Rayleigh fading channel for both a sample mean method and a difference method.
Figure 3:
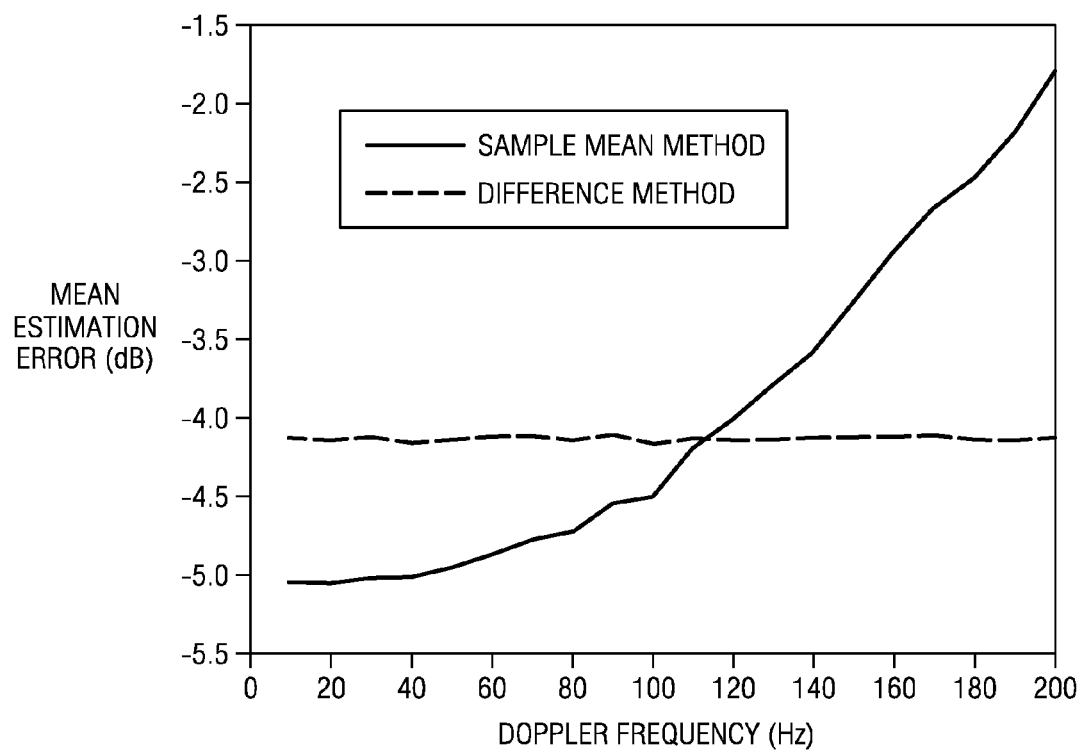
FIG. 3 is a graph depicting plots for the standard deviation of the interference estimator shown in FIG. 2 with respect to its mean in a Rayleigh fading channel for both the sample mean method and the difference method.

FIGS. 2 and 3 illustrate both the underestimation problem in a static or slow-fading channel and the overestimation problem in a dynamic or fast-fading channel of the sample mean method. So, to overcome these problems, the present method uses a difference value of the phase-corrected pilot symbol p'(t) to estimate the interference in the pilot channel (the difference method):

$$\hat{\sigma}_p^2 = \frac{1}{2\alpha^2}\sum_{t=1}^{N_s}|p'(t) - p'(t-1)|^2. \quad (4)$$

The difference in time removes the need for estimating the mean while canceling out the time-varying effects of fading channels. Ignoring the edge effect, the expected value of the proposed estimator can then be calculated as follows:

$$E[\hat{\sigma}_p^2] = \sigma_p^2 + \frac{1}{\alpha^2 N_s}\sum_{t=1}^{N_s}(\alpha^2(t) - \alpha^2(t-1))^2.$$

Here the interference is assumed to be independently identical distributed. As illustrated in FIG. 2, the present estimator (the difference method) has a much smaller bias than the sample mean method in a fast-fading channel.

The difference method in equation (4) applies to various types of inner receivers such as a Rake receiver, an MMSE receiver, an equalizer, a decorrelating receiver or an interference canceller. Especially in the case of a Rake receiver where a multipath combining is used, there are two methods of calculating the post-combiner interference: the sum of each finger's interference (the interference sum method) and the interference of the combined pilot (the combined pilot method). First, the interference estimation from each demodulator is summed as follows:

$$\alpha^2\hat{\sigma}_p^2 = \sum_{f=1}^{N_f}\alpha_f^2\hat{\sigma}_{p,f}^2 \quad (5)$$

Here, $N_f$ is the number of fingers or demodulating elements, and $\hat{\sigma}_{p,f}^2$ is the interference estimated from each finger according to equation (4), wherein each finger's interference is weighted according to its channel gain, $\alpha_f$. Alternatively, one can estimate the interference of the combined pilot symbol that is processed in the exactly same way as the data symbols are combined:

$$p_c(t) = \sum_{f=1}^{N_f}h_f^*(t)p_f(t).$$

$$\alpha^2\hat{\sigma}_p^2 = \frac{1}{2}\sum_{t=1}^{N_s}|p_c(t) - p_c(t-1)|^2.$$

Other forms of interference summation can be employed to improve the estimation accuracy. But, the interference combining scheme must be commensurate with the data combining scheme in terms of the weighting factor or gain.

Similiarly, when multiple antennas are employed at the transmitter or at the receiver, the interference at the output of the antenna combiner can be calculated from either the sum of each antenna's interference or the interference of the combined pilot. In the case of transmit antenna diversity (OTD and STS in CDMA2000 and STTD and CLTD in W-CDMA for example), each transmit antenna transmits a separate pilot channel that is orthogonal to the other transmit antenna's pilot channels. These orthogonal pilot channels must be uncovered with different pilot symbol sequence as explained in equation (1). On the other hand, in the case of receiver antenna diversity, each antenna receiver uses the same pilot channel. The estimation of the channel gain and the interference is performed on the corresponding pilot channel.

Method 1: $\alpha^2 \hat{\sigma}_p^2 = \sum_{a=1}^{N_a} \alpha_a^2 \hat{\sigma}_{p,a}^2.$ Method 2: $\alpha^2 \hat{\sigma}_p^2 = \frac{1}{2} \sum_{t=1}^{N_s} |p_c(t) - P_c(t-1)|^2,$ where $p_c(t) = \sum_{a=1}^{N_a} h_a^*(t) p_a(t).$ Here, $N_a$ is the number of transmit antennas, and $\alpha_a^2 \hat{\sigma}_{p,a}^2$ is the interference of antenna a that is estimated from its pilot channel $p_a(t)$ according to equation (4) in general or equation (5) for a Rake receiver, wherein each antenna's interference is weighted according to its channel gain. Here it is assumed that the finger combining for each antenna is performed prior to the antenna combining; but the antenna combining can be performed first and be followed by the finger combining.

After channel correction and channelization code uncovering, the phase-corrected data symbol is equal to $$d'(t) = h^*(t) d(t) = \alpha^2(t) + \alpha(t) e^{-j\phi(t)} n_d(t).$$

Since the interference or the noise variance after despreading is proportional to the spreading factor, after the channel correction, the interference in the data channel is equal to $$\alpha^2 \hat{\sigma}_d^2 = \frac{N_d}{N_p} \alpha^2 \hat{\sigma}_p^2. \quad (6)$$

Here, $N_d$ and $N_p$ are the spreading factor of the data channel and the pilot channel, respectively. This linear dependency (6) holds true even in the presence of channel estimation error: $\hat{h}(t) = h(t) + n_h(t)$, where $n_h(t)$ represents the estimation error with variance equal to $\sigma_e^2$. As prediced by equation (1), the channel estimation error increases the estimated noise variance of the pilot and data channel as follows:

$$\hat{\sigma}_p^2 = \sigma_p^2 + |s_p|^2 \sigma_e^2 \quad (7)$$

and $$\hat{\sigma}_d^2 = \sigma_s^2 + |s_d|^2 \sigma_e^2, \quad (8),$$

respectively.

Equation (6) is still true because $$|s_d|^2 = \frac{N_d}{N_p} |s_p|^2,$$

and is needed to estimate the total interference of the data channel for decoding including the effect of the channel estimation error as in equation (8).

This combined interference estimation can be further low-pass filtered to achieve better accuracy. The bandwidth of the low pass filter should be set such that the filtering suppresses the measurement noise while fast enough to detect the change in interference level. Using this variance estimation, the present method sets the gain of the scaling block 20 to $$g = \frac{\lambda}{\sqrt{\frac{1}{2} \alpha^2 \hat{\sigma}_d^2}}$$

$$= \begin{cases} \sqrt{\frac{N_p}{N_d}} \dfrac{2}{\sqrt{L\left[\sum_{i=1}^{N} \alpha_i^2 \hat{\sigma}_{p,i}^2\right]}} & \text{Interference sum method} \\ \\ \sqrt{\frac{N_p}{N_d}} \dfrac{2}{\sqrt{L\left[\sum_{t=1}^{N_s} |p_c(t) - p_c(t-1)|^2\right]}} & \text{Combined pilot method} \end{cases}$$

Here, $\lambda$ is the set point parameter for the scaling block, L[x] represents a low pass filtering operation, and N is the number of demodulating elements in case of a Rake receiver or an antenna combiner. Note that the variance in one dimension is half the variance in the complex domain. If the combining schemes for the data and the interference estimator are identical, the standard deviation of the decoder input after this scaling block, is equal to this set point.

Figure 4:
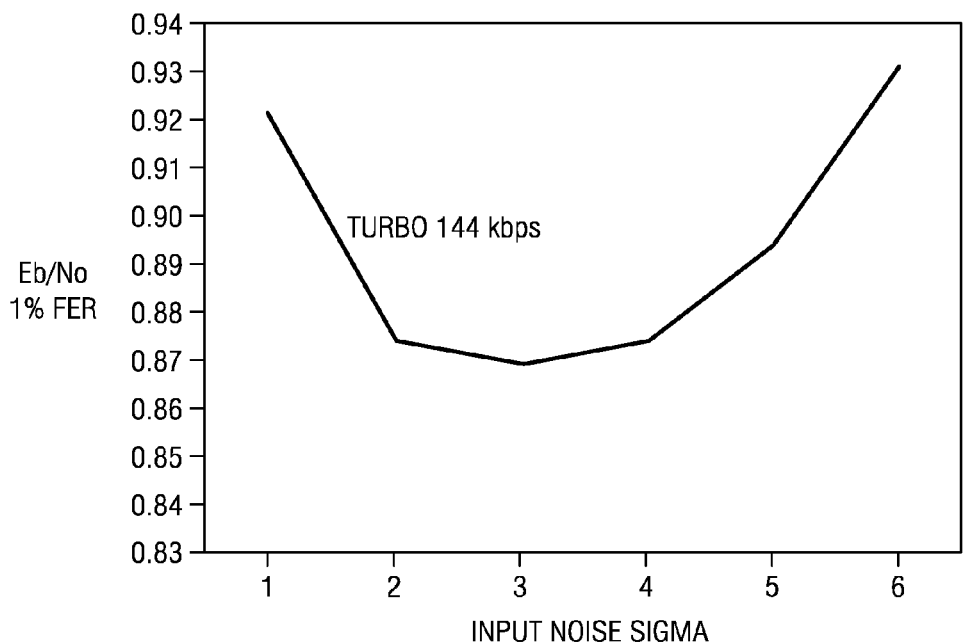
FIG. 4 is a plot showing the effect of the set point on the turbo decoder performance using a 3GPP turbo code and a decoder input precision equal to 5-bits.

The effect of the set point parameter on the turbo decoder performance in an AWGN channel has been shown by others such as depicted in FIG. 4. The optimal set point is near 3 for a 5-bit input. This optimal set point value was found by the present inventor to work suitably in the fading channel as well. FIG. 5 shows the block error rate (BLER) performance of a 144 kbps turbo decoder in a 3 km/h fading channel (Case 1 channel in 3GPP TS 25.101). As compared with an 8-bit decoder input case, the performance of the present scaling method with just 5 bits is shown to be within 0.1 dB difference.

Other scaling methods were found to yield worse performance than the present method; and their degradations were found to depend heavily on the signal-to-noise (S/N) ratio and the fading rate.

The present method of estimating interference also lends itself to other applications in the UE modem such as 1) signal-to-interference estimation for downlink inner-loop power control, 2) constant-false alarm threshold setting for on-off keyed (OOK) symbol detection of indicator channels like QPCH in CDMA2000 and AICH in W-CDMA, 3) post scaling for QAM log-likelihood ratio calculation, and so on.

The present method reduces the memory requirement with negligible degradation of the decoder performance. The present method with a 5-bit decoder input and the optimal set point value has been shown to yield performance as good as an 8-bit input. The present method is therefore advantageous and desirable in saving the memory of the frame buffer and the gate count of the decoder. The memory size of the CDMA modem chips is dominated by the CCTrCh frame buffer and the decoder frame buffer. With an 8-bit wide frame buffer, the size of the two memories corresponds to 15.4 square milimeters, even when using state-of-the-art technology, e.g., GS40 library as shown in Table 1 associated with parts available from Texas Instruments Incorporated of Dallas, Tex. The present method of scaling the decoder input reduces the bit width requirement and was found to save 5.7 square milimeters of the die area in one application. This is equivalent to saving 901,000 gates which is quite a significant savings.

TABLE 1

Memory savings by applying the present method to a UMTS 384 kbps class modem chip.

| | 5-bit word | 8-bit word |
|---|---|---|
| CCTrCh frame buffer size in bits (192 kword) | 960 kbits | 1536 kbits |
| Decoder input buffer size in bits (16 kword) | 80 kbits | 128 kbits |
| Total area in sqmm* | 9.6 sqmm | 15.4 sqmm |
| Equivalent gates | 1.5 million gates | 2.4 million gates |
| Savings in memory size | 624 kbits | |
| Savings in die area | 5.7 sqmm | |
| Savings in equivalent gate count | 901 kgates | |

*130 nm C035 (GS40) w/high density SRAM compiler: Dual port CRAM density = 108 kbits per sqmm, Logic gate density = 156 kgates per sqmm.

In summary explanation, a method estimates the interference of an inner receiver output and scales the decoder input such that its variance is kept constant in order to optimize the decoder performance for a small number of input bits. The present method estimates the interference of the Pilot channel and translates it into the interference of the data channel in order to avoid the estimation bias problem in a noisy channel. To solve the fading rate dependency problem of the sample mean method, the present method uses a difference value of the phase-corrected pilot symbol. In the Rake receiver, the present method sums up the interference estimated from each finger. It is then simple to find an optimal set point value for the present method in static channel. The present method using a 5-bit decoder input and the optimal set point value yields performance as good as an 8-bit input. This scheme is critical in saving the memory of the frame buffer and the gate count of the decoder.

In view of the above, it can be seen the present invention presents a significant advancement in the art of decoder input scaling. A method and apparatus have been implemented to achieve decoder input scaling based on interference estimation in CDMA applications. Further, this invention has been described in considerable detail in order to provide those skilled in the data communication art with the information needed to apply the novel principles and to construct and use such specialized components as are required. In view of the foregoing descriptions, it should be apparent that the present invention represents a significant departure from the prior art in construction and operation. However, while particular embodiments of the present invention have been described herein in detail, it is to be understood that various alterations, modifications and substitutions can be made therein without departing in any way from the spirit and scope of the present invention, as defined in the claims which follow.

What is claimed is:

1. A method comprising the steps of:
   estimating the interference of a pilot channel at an output of an inner receiver;
   translating the estimated interference of the pilot channel into the interference of a data channel; and
   scaling the decoder input using a root mean square (RMS) technique in response to the estimated interference such that the noise variance of the scaled decoder input remains constant.

2. A method of scaling a CDMA wireless channel decoder input, the method comprising the steps of:
   estimating the interference of an inner receiver output, comprising:
      estimating the interference of the CDMA Pilot channel at the output of the inner receiver; and
      translating the estimated interference of the Pilot channel into the interference of the CDMA data channel, such that estimation bias problems associated with a noisy CDMA channel are substantially eliminated; and
   scaling the decoder input using a root mean square (RMS) technique in response to the estimated interference such that the noise variance of the scaled decoder input remains constant.

3. The method according to claim 2, wherein the step of estimating the interference of the CDMA Pilot channel comprises determining a difference value associated with a phase-corrected pilot symbol, such that fading channel impairments are substantially mitigated.

4. A method comprising the steps of:
   estimating the interference of a pilot channel at an output of an inner receiver comprising summing the interference at each inner receiver finger output according to a relationship defined as $$\alpha^2 \hat{\sigma}_p^2 = \sum_{f=1}^{N_f} \alpha_f^2 \hat{\sigma}_{p,f}^2,$$

where $N_f$ is the number of fingers or demodulators, and $\hat{\sigma}_{p,f}^2$ is the interference estimated from each finger, wherein each finger's interference is weighted according to its channel gain, $\alpha_f$;
   translating the estimated interference of the pilot channel into the interference of a data channel; and
   scaling the decoder input using a root mean square (RMS) technique in response to the estimated interference such that the noise variance of the scaled decoder input remains constant.

5. A method of scaling a CDMA wireless channel decoder input, the method comprising the steps of:
   estimating the interference of an inner receiver output, comprising:
      estimating the interference in a combined pilot symbol; and
      processing the combined pilot symbol in a manner substantially identical with combining of data symbols according to a relationship defined as $$\alpha^2 \hat{\sigma}_p^2 = \frac{1}{2} \sum_{t=1}^{N_s} |p_c(t) - p_c(t-1)|^2,$$

where $p_c(t)$ is the combined pilot symbol and $N_s$ is the number of complex pilot symbols in the CDMA estimation interval; and
   scaling the decoder input in response to the estimated interference such that the noise variance of the scaled decoder input remains constant.

6. A method comprising the steps of:
   estimating the interference of a pilot channel at an output of an inner receiver comprising estimating the interference of a transmit antenna diversity receiver output via estimating a post-combiner interference by summing the interference from each antenna demodulating element according to a relationship defined as $$\alpha^2 \hat{\sigma}_p^2 = \sum_{a=1}^{N_a} \alpha_a^2 \hat{\sigma}_{p,a}^2,$$

where $N_a$ is the number of transmit antennas, and $\alpha_a^2 \hat{\sigma}_{p,a}^2$ is the interference of antenna a that is estimated from its pilot channel $p_a(t)$, and wherein each antenna's interference is weighted according to its channel gain
 translating the estimated interference of the pilot channel into the interference of a data channel; and
 scaling the decoder input using a root mean square (RMS) technique in response to the estimated interference such that the noise variance of the scaled decoder input remains constant.

7. A method of scaling a CDMA wireless channel decoder input, the method comprising the steps of:
 estimating the interference of an inner receiver output, comprising estimating the interference of a transmit antenna diversity receiver output via estimating a post-combiner interference by estimating the interference in a combined pilot according to a relationship defined as $$\alpha^2 \hat{\sigma}_p^2 = \frac{1}{2} \sum_{t=1}^{N_s} |p_c(t) - P_c(t-1)|^2, \text{ where } p_c(t) = \sum_{a=1}^{N_a} h_a^*(t) p_a(t),$$

and where $h_a^*(t)$ is the complex conjugate channel response associated with antenna a, $N_s$ is the number of complex pilot symbols in the CDMA estimation interval, $N_a$ is the number of transmit antennas, and $p_a(t)$ is the despread pilot symbol of each antenna a after uncovering orthogonal pilot symbol sequence; and
 scaling the decoder input in response to the estimated interference such that the noise variance of the scaled decoder input remains constant.

8. A method comprising the steps of:
 estimating the interference of a pilot channel at an output of an inner receiver comprising estimating the interference of a receive antenna diversity receiver output via estimating a post-combiner interference by summing the interference from each antenna demodulating element according to a relationship defined as $$\alpha^2 \hat{\sigma}_p^2 = \sum_{a=1}^{N_a} \alpha_a^2 \hat{\sigma}_{p,a}^2,$$

where $N_a$ is the number of receive antennas, and $\alpha_a^2 \hat{\sigma}_{p,a}^2$ is the interference of antenna a that is estimated from its pilot channel $p_a(t)$, and wherein each antenna's interference is weighted according to its channel gain
 translating the estimated interference of the pilot channel into the interference of a data channel; and
 scaling the decoder input using a root mean square (RMS) technique in response to the estimated interference such that the noise variance of the scaled decoder input remains constant.

9. A method of scaling a CDMA wireless channel decoder input, the method comprising the steps of:
 estimating the interference of an inner receiver output, comprising estimating the interference of a receive antenna diversity receiver output via estimating a post-combiner interference by estimating the interference in a combined pilot according to a relationship defined as $$\alpha^2 \hat{\sigma}_p^2 = \frac{1}{2} \sum_{t=1}^{N_s} |p_c(t) - P_c(t-1)|^2,$$

where $$p_c(t) = \sum_{a=1}^{N_a} h_a^*(t) p_a(t),$$

and where $h_a^*(t)$ is the complex conjugate channel response associated with antenna a, $N_s$ is the number of complex pilot symbols in the CDMA estimation interval, $N_a$ is the number of receive antennas, and $p_a(t)$ is the pilot channel received by antenna demodulating element a; and
 scaling the decoder input in response to the estimated interference such that the noise variance of the scaled decoder input remains constant.

10. A decoder input scaling apparatus comprising:
 a decoder;
 an inner receiver responsive to a digitized input signal and operational to generate a plurality of output signals there from;
 an interference estimator operational to estimate the interference of a pilot channel at an output of each inner receiver and translate the estimated interference of each pilot channel into the interference of a data channel; and
 a scaling factor calculator operational to scale the decoder input using a root mean square (RMS) technique in response to the estimated interference in association with a desired set point such that the noise variance of the scaled decoder input remains constant.

11. The decoder input scaling apparatus according to claim 10 further comprising:
 a variable gain amplifier (VGA) operational to amplify an RF input signal;
 a analog-to-digital (A/D) converter operational to generate the digitized input signal in response to the amplified RF input signal; and
 an automatic gain control (AGC) operational to control the gain of the variable gain amplifier, wherein the VGA, A/D converter, AGC, inner receiver, interference estimator, scaling factor calculator and decoder implement a user equipment receiver chain.

12. A method of scaling a decoder input, the method comprising the steps of:
 estimating data channel interference from pilot channel interference; and
 scaling the decoder input in response to the estimated data channel interference using a root mean square (RMS) technique such that the noise variance of the scaled decoder input remains constant.

13. A method of scaling a decoder input, the method comprising the steps of:
 estimating data channel interference from pilot channel interference comprising:
  estimating the interference of a CDMA Pilot channel; and
  translating the estimated interference of the Pilot channel into the interference of a CDMA data channel, such that estimation bias problems associated with a noisy CDMA channel are substantially eliminated; and scaling the decoder input using a root mean square (RMS) technique in response to the estimated data channel interference such that the noise variance of the scaled decoder input remains constant.

14. A method of scaling a decoder input, the method comprising the steps of:

estimating data channel interference from pilot channel interference comprising determining a difference value associated with a phase-corrected pilot symbol, such that fading channel impairments are substantially mitigated; and scaling the decoder input using a root mean square (RMS) technique in response to the estimated data channel interference such that the noise variance of the scaled decoder input remains constant.

15. A method of scaling a decoder input, the method comprising the steps of:

estimating data channel interference from pilot channel interference comprising summing the interference at each finger of a Rake receiver output according to a relationship defined as $$\alpha^2 \hat{\sigma}_p^2 = \sum_{f=1}^{N_f} \alpha_f^2 \hat{\sigma}_{p,f}^2,$$

where $N_f$ is the number of fingers or demodulators, and $\hat{\sigma}_{p,f}^2$ is the interference estimated from each finger, and wherein each finger's interference is weighted according to its channel gain, $\alpha_f$; and scaling the decoder input in response to the estimated data channel interference using a root mean square (RMS) technique such that the noise variance of the scaled decoder input remains constant.

16. A method of scaling a decoder input, the method comprising the steps of:

estimating data channel interference from pilot channel interference comprising:

estimating the interference in a combined pilot symbol; and processing the combined pilot symbol in a manner substantially identical with combining of data symbols according to a relationship defined as $$\alpha^2 \hat{\sigma}_p^2 = \frac{1}{2} \sum_{t=1}^{N_s} |p_c(t) - p_c(t-1)|^2,$$

where $p_c(t)$ is the combined pilot symbol and $N_s$ is the number of complex pilot symbols in the estimation interval; and scaling the decoder input in response to the estimated data channel interference such that the noise variance of the scaled decoder input remains constant.

17. A method of scaling a decoder input, the method comprising the steps of:

estimating data channel interference from pilot channel interference comprising estimating the interference of a transmit antenna diversity receiver output via estimating a post-combiner interference by summing the interference from each antenna demodulating element according to a relationship defined as $$\alpha^2 \hat{\sigma}_p^2 = \sum_{a=1}^{N_a} \alpha_a^2 \hat{\sigma}_{p,a}^2,$$

where $N_a$ is the number of transmit antennas, and $\alpha_a^2 \hat{\sigma}_{p,a}^2$ is the interference of antenna a that is estimated from its pilot channel $p_a(t)$, and wherein each antenna's interference is weighted according to its channel gain; and scaling the decoder input in response to the estimated data channel interference using a root mean square (RMS) technique such that the noise variance of the scaled decoder input remains constant.

18. A method of scaling a decoder input, the method comprising the steps of:

estimating data channel interference from pilot channel comprising estimating the interference of a transmit antenna diversity receiver output via estimating a post-combiner interference by estimating the interference in a combined pilot according to a relationship defined as $$\alpha^2 \hat{\sigma}_p^2 = \frac{1}{2} \sum_{t=1}^{N_s} |p_c(t) - P_c(t-1)|^2, \text{ where } p_c(t) = \sum_{a=1}^{N_a} h_a^*(t) p_a(t),$$

and where $h_a^*(t)$ is the complex conjugate channel response associated with antenna a, $N_s$ is the number of complex pilot symbols in the estimation interval, $N_a$ is the number of transmit antennas, and $p_a(t)$ is the despread pilot symbol of each antenna after uncovering its orthogonal pilot symbol sequence; and scaling the decoder input in response to the estimated data channel interference such that the noise variance of the scaled decoder input remains constant.

19. A method of scaling a decoder input, the method comprising the steps of:

estimating data channel interference from pilot channel interference comprising estimating the interference of a receive antenna diversity receiver output via estimating a post-combiner interference by summing the interference from each antenna demodulating element according to a relationship defined as $$\alpha^2 \hat{\sigma}_p^2 = \sum_{a=1}^{N_a} \alpha_a^2 \hat{\sigma}_{p,a}^2,$$

where $N_a$ is the number of receive antennas, and $\alpha_a^2 \hat{\sigma}_{p,a}^2$ is the interference of antenna a that is estimated from its pilot channel $p_a(t)$, and wherein each antenna's interference is weighted according to its channel gain; and scaling the decoder input in response to the estimated data channel interference using a root mean square (RMS) technique such that the noise variance of the scaled decoder input remains constant.

20. A method of scaling a decoder input, the method comprising the steps of:

estimating data channel interference from pilot channel interference comprising estimating the interference of a receive antenna diversity receiver output via estimating a post-combiner interference by estimating the interference in a combined pilot according to a relationship defined as $$\alpha^2 \hat{\sigma}_p^2 = \frac{1}{2} \sum_{t=1}^{N_s} |p_c(t) - P_c(t-1)|^2, \text{ where } p_c(t) = \sum_{a=1}^{N_a} h_a^*(t) p_a(t),$$

and where $h_a^*(t)$ is the complex conjugate channel response associated with antenna a, $N_s$ is the number of complex pilot symbols in the estimation interval, $N_a$ is the number of receive antennas, and $p_a(t)$ is the pilot channel received by antenna demodulating element a; and scaling the decoder input in response to the estimated data channel interference such that the noise variance of the scaled decoder input remains constant.

* * * * *